(12) United States Patent
Gormley

(10) Patent No.: US 9,938,929 B2
(45) Date of Patent: Apr. 10, 2018

(54) THRUST REVERSER FOR A TURBOFAN ENGINE

(71) Applicant: Rohr, Inc., Chula Vista, CA (US)

(72) Inventor: Timothy Gormley, Bonita, CA (US)

(73) Assignee: Rohr, Inc., Chula Vista, CA (US)

( * ) Notice: Subject to any disclaimer, the term of this patent is extended or adjusted under 35 U.S.C. 154(b) by 426 days.

(21) Appl. No.: 14/222,134

(22) Filed: Mar. 21, 2014

(65) Prior Publication Data
US 2015/0267640 A1 Sep. 24, 2015

(51) Int. Cl.
*F02K 1/72* (2006.01)
*F02K 1/80* (2006.01)

(52) U.S. Cl.
CPC ............. *F02K 1/72* (2013.01); *F02K 1/80* (2013.01); *Y02T 50/672* (2013.01)

(58) Field of Classification Search
CPC ... F02K 1/70; F02K 1/72; F02K 1/763; F02K 1/766; F02K 1/62; F02K 1/625
See application file for complete search history.

(56) References Cited

U.S. PATENT DOCUMENTS

| | | | |
|---|---|---|---|
| 3,380,662 A * | 4/1968 | Miller | F02K 1/62 239/265.37 |
| 3,612,209 A * | 10/1971 | Vdoviak | F02K 1/1269 181/211 |
| 3,614,037 A | 10/1971 | Vdolek | |
| 3,853,289 A * | 12/1974 | Nevermann | B64C 9/16 244/215 |
| 4,275,560 A | 6/1981 | Wright et al. | |
| 5,046,307 A | 9/1991 | Matta et al. | |
| 6,474,059 B2 | 11/2002 | Stretton | |
| 6,845,946 B2 | 1/2005 | Lair | |
| 7,559,507 B2 | 7/2009 | Harrison et al. | |
| 7,600,371 B2 | 10/2009 | Sternberger | |
| 7,690,190 B2 | 4/2010 | Thornock et al. | |
| 8,109,467 B2 | 2/2012 | Murphy | |
| 8,256,204 B2 | 9/2012 | Hatrick | |
| 9,127,623 B2 * | 9/2015 | Peyron | F02K 1/72 |
| 2001/0010148 A1 * | 8/2001 | Michel | F02K 1/72 60/226.1 |

(Continued)

FOREIGN PATENT DOCUMENTS

FR 2982323 * 5/2013 ............... F02K 1/72

OTHER PUBLICATIONS

FR search report for FR1552321 dated Mar. 3, 2017.

*Primary Examiner* — Andrew Nguyen
(74) *Attorney, Agent, or Firm* — O'Shea Getz P.C.

(57) ABSTRACT

A thrust reverser of a turbofan engine has a translating structure and a blocker door device capable of diverting a bypass flowpath for reversing propulsion direction. The translating structure moves axially between a forward position and a rearward position and thereby drives a compound motion of a blocker door of the blocker door device that moves between a respective stowed state and a deployed state. The compound motion is attributable through the blocker door being pivotally engaged to the translating structure, and through a multi-armed linkage of the device being pivotally engaged between a stationary structure, the blocker door and the translating structure. The linkage is further orientated such that it does not appreciably obstruct the bypass flowpath when the blocker door is in the stowed state.

16 Claims, 5 Drawing Sheets

(56) References Cited

U.S. PATENT DOCUMENTS

| | | |
|---|---|---|
| 2005/0151012 A1 | 7/2005 | Lair |
| 2009/0321561 A1* | 12/2009 | Andre ..................... F02K 1/72 244/110 B |
| 2012/0193448 A1 | 8/2012 | Caruel |
| 2013/0263600 A1 | 10/2013 | Vauchel et al. |
| 2013/0280052 A1 | 10/2013 | Gonidec et al. |

* cited by examiner

THRUST REVERSER FOR A TURBOFAN ENGINE

BACKGROUND

The present disclosure relates to a thrust reverser for a turbofan engine and more particularly to a hidden blocker door device of the thrust reverser.

Turbofan engines are known to include a fan section that produces a bypass airflow for providing the majority of engine propulsion and a combustion or core airflow for compression, mixing with fuel, combustion and expansion through a turbine to drive the fan section. The engines further include nacelles that partially surround the core of the engine, include a pylon for securing the engine to a structure such as an aircraft wing, and provide an annular bypass airflow duct for directing the bypass airflow in a rearward direction to produce forward propulsion. The nacelles may further include thrust reversers capable of redirecting the bypass airflow from the rearward direction to, at least partially, a forward direction thus producing rearward propulsion. As an example, such rearward propulsion may serve to decelerate the forward motion of an aircraft soon after landing.

Thrust reversers may include a plurality of blocker doors physically capable of changing positions through mechanical and hydraulic linkages from a stowed position for forward propulsion and to a deployed position for rearward propulsion. There exists a need to improve such linkages and reduce linkage obstruction in the bypass airflow duct.

SUMMARY

A blocker door device according to one, non-limiting, embodiment of the present disclosure includes a blocker door; a first arm pivotally connected to the blocker door; a second arm pivotally connected to the first arm; and a third arm pivotally connected to the second arm.

Additionally to the foregoing embodiment, the blocker door device includes a pivotal connection engaged to the blocker door; a first joint spaced from the pivotal connection and connecting the blocker door and the first arm; a second joint spaced from the first joint along the first arm and connecting the first and second arms; and a third joint engaged to the second arm and spaced from the second joint along the second arm.

In the alternative or additionally thereto, in the foregoing embodiment, the blocker door device includes a fourth joint engaged to the third arm; and a fifth joint spaced from the forth joint along the third arm and connecting the third arm to the second arm.

In the alternative or additionally thereto, in the foregoing embodiment, the fifth joint is proximate to the second joint.

In the alternative or additionally thereto, in the foregoing embodiment, the fifth joint is located between the third joint and the second joint along the second arm.

In the alternative or additionally thereto, in the foregoing embodiment, the joints are constructed and arranged to pivot about respective axis that are substantially parallel to one-another.

In the alternative or additionally thereto, in the foregoing embodiment, the blocker door has a stowed state, a transitory state and a deployed state, and the third joint is constructed and arranged to reverse in rotating direction generally at the transitory state and as the blocker door moves between the stowed and deployed states.

In the alternative or additionally thereto, in the foregoing embodiment, the third arm projects through the blocker door.

A thrust reverser according to another, non-limiting, embodiment includes a fixed structure; a translating structure constructed and arranged to move between a first position and second position; and a blocker door device having a blocker door pivotally connected to the translating structure and constructed and arranged to move between a stowed state and a deployed, and a multi-armed linkage pivotally engaged to the blocker door, the fixed structure and the translating structure for positioning the blocker door in the stowed state when the translating structure is in the first position, and in the deployed state when the translating structure is in the second position.

Additionally to the foregoing embodiment, the thrust reverser includes a cascade array engaged to the fixed structure and for diverting a bypass flowpath defined in-part by the blocker door, and when the blocker door is in the deployed state.

In the alternative or additionally thereto, in the foregoing embodiment the translating structure is substantially cylindrical and concentric to an axis, and the blocker door device is one of a plurality of blocker door devices distributed circumferentially about the axis.

In the alternative or additionally thereto, in the foregoing embodiment, the translating structure moves axially between the first and second positions.

In the alternative or additionally thereto, in the foregoing embodiment, the thrust reverser includes a pivotal connection engaged between a forward end portion of the translating structure and a base edge portion of the blocker door; and the blocker door extends from the base edge portion and to an opposite distal edge of the blocker door, and extends substantially axially when in the stowed state and at least in-part radially when in the deployed state.

In the alternative or additionally thereto, in the foregoing embodiment, the multi-armed linkage does not obstruct a bypass flowpath defined in-part by the blocker door when in the stowed state.

In the alternative or additionally thereto, in the foregoing embodiment, the blocker door has compound-motion and pivots about the pivotal connection when moving between the stowed and deployed states and the translating structure moves axially between the first and second positions.

The foregoing features and elements may be combined in various combinations without exclusivity, unless expressly indicated otherwise. These features and elements as well as the operation thereof will become more apparent in-light of the following description and the accompanying drawings. It should be understood, however, the following description and figures are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
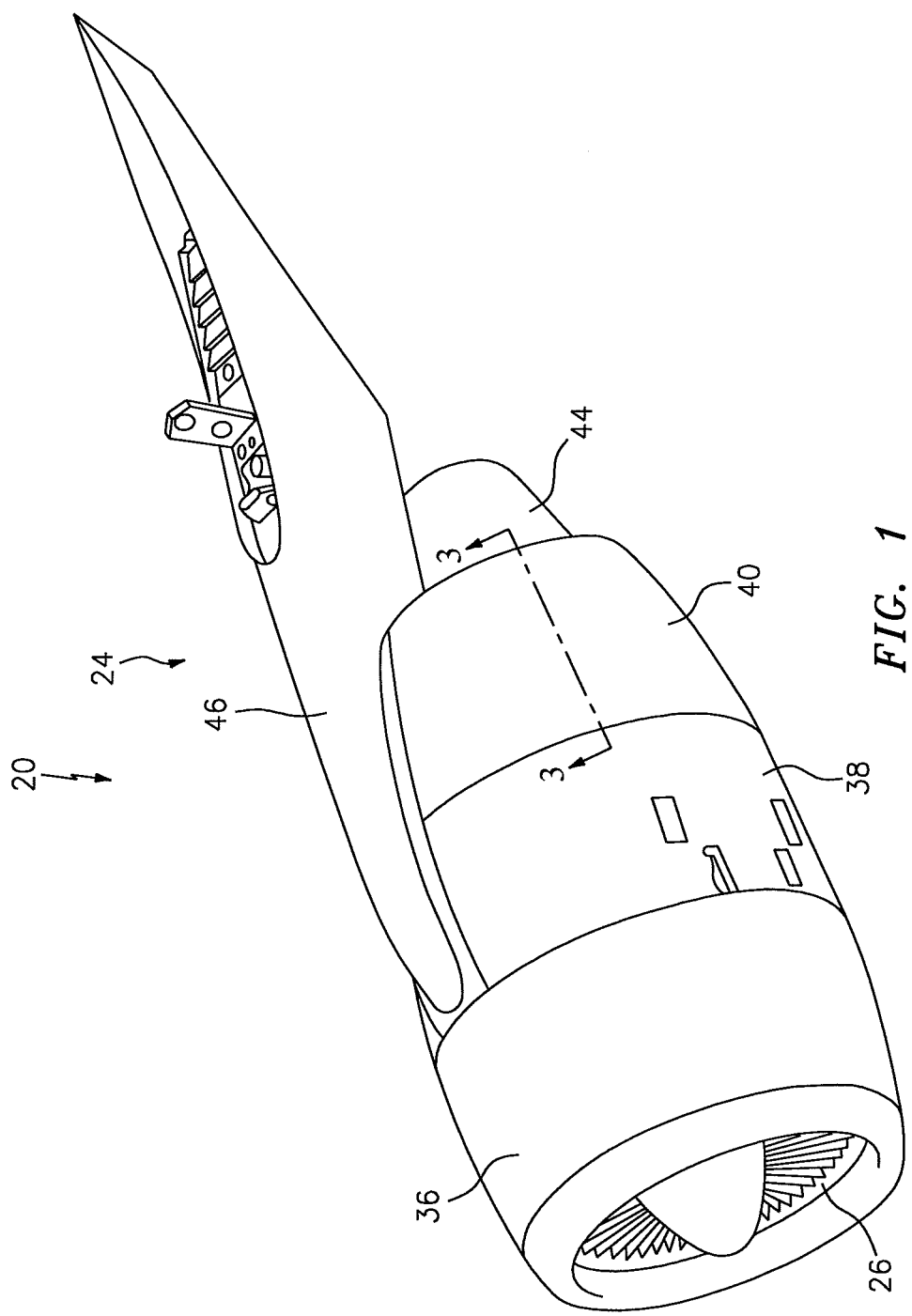
FIG. 1 is a perspective view of a turbofan engine according to one non-limiting embodiment of the present disclosure.
Figure 2:
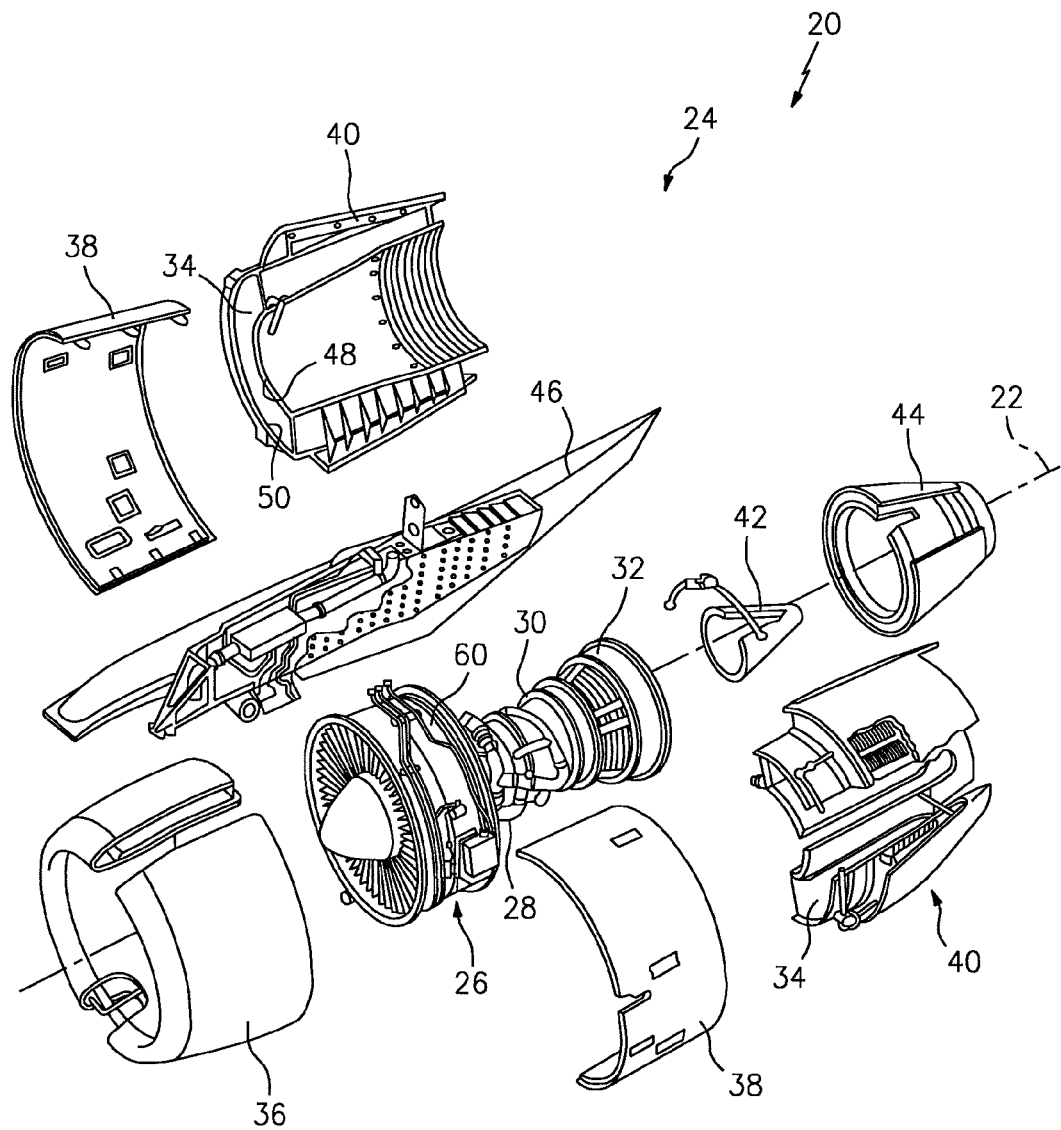
FIG. 2 is an exploded view of the turbofan engine.

Referring to FIGS. 1 and 2, a turbofan engine 20 is centered about an axis 22 and includes a nacelle 24 that supports and generally surrounds an inner engine core that includes a fan section 26, a compressor section 28, a combustor section 30 and a turbine section 32. The fan section 26 drives air along a bypass flowpath or duct 34. A portion of air from the fan section 26 enters the engine core flowpath (not shown) for compression by the compressor section 28, then into the combustor section 30. The core air is mixed with fuel in the combustor section 30 and burned producing energy. The core air or exhaust from the combustor section 30 is expanded through the turbine section 32 and, in-turn, drives a central shaft (not shown) that powers the fan section 26.

The combusted core airflow generally powers the fan section 26 and the bypass airflow provides the majority of forward propulsion for the engine 20. More traditional turbofan engines may have a bypass airflow to core airflow ratio (i.e. bypass ratio) of about six (6:1). More recent high-bypass ratio engines, such as a geared turbofan engine may have greater bypass ratios and that may exceed ten (10:1).

The nacelle 24 may include an intake cowl 36 disposed forward of the fan section 26, a fan cowl 38 that circumferentially surrounds and shields the fan section 26, a thrust reverser 40 that may circumferentially surround the compressor, combustor and turbine sections 28, 30, 32, an exhaust centerbody 42 aft of the turbine section 32, an exhaust nozzle 44 that is spaced radially outward from the exhaust centerbody 42, and a pylon 46 that supports the engine 20 typically to an undercarriage of an aircraft wing (not shown).

Figure 3:
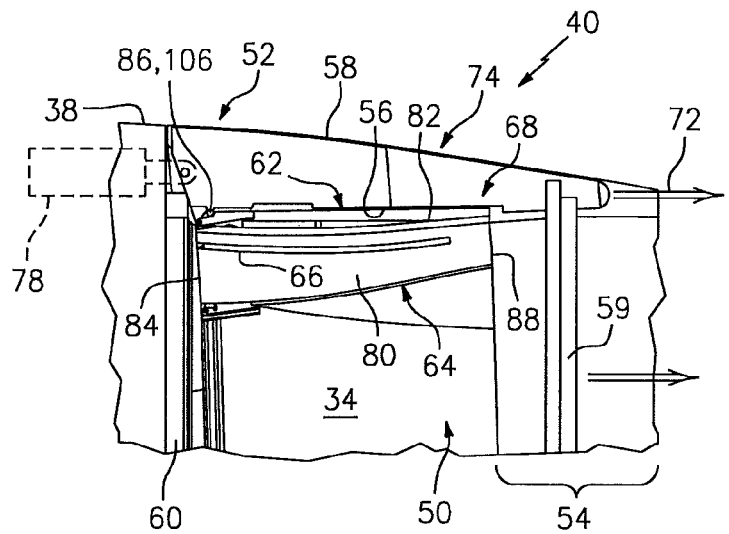
FIG. 3 is a partial cross sectional view of a thrust reverser with a blocker door in a stowed state and taken along line 3-3 of FIG. 1.
Figure 4:
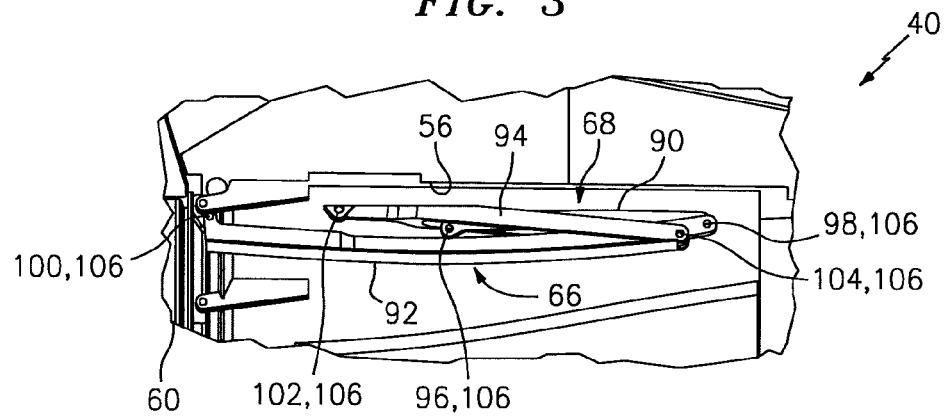
FIG. 4 is a partial cross sectional view of the thrust reverser similar to FIG. 3 but with the blocker door removed to show internal detail.
Figure 5:
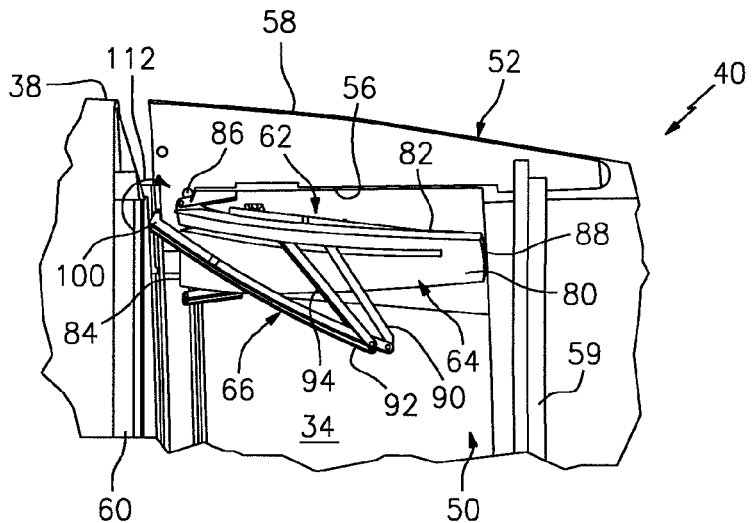
FIG. 5 is a partial cross sectional view of the thrust reverser moving toward a deployed state from the stowed state.
Figure 6:
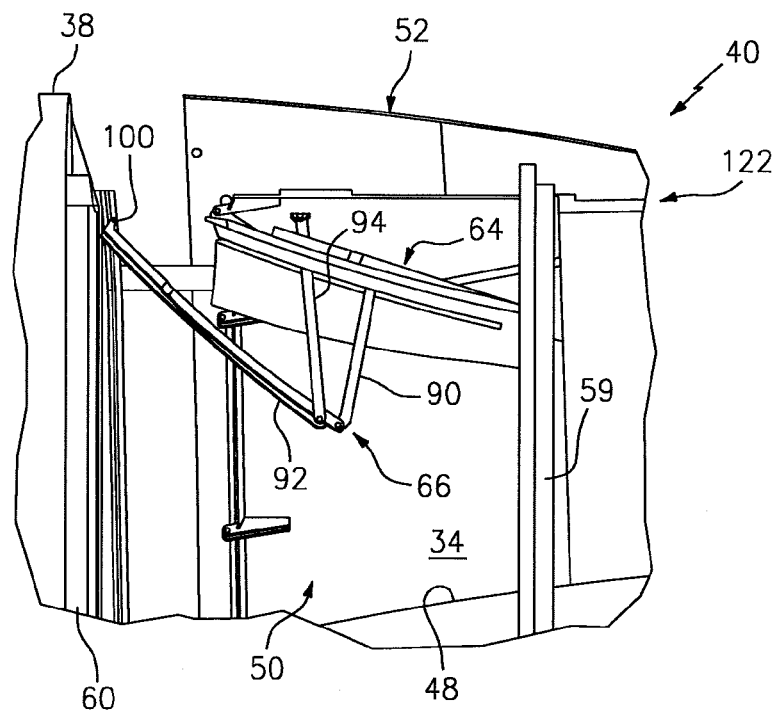
FIG. 6 is a partial cross sectional view of the thrust reverser in a transitional state and moving further toward the deployed state.

Referring to FIGS. 2 through 4, the thrust reverser 40 generally has an inner shell 48 (see FIG. 6) and a translating outer shell 50 spaced radially outward from the inner shell 48. The bypass flowpath 34 is defined by and located radially between the inner and outer shells 48, 50; may be generally annular in shape; and, may be located immediately downstream of the fan section 26. The outer shell 50 may have a forward section or translating structure 52 and an aft section 54 with both being generally cylindrical and concentric to the engine axis 22. The aft section 54 may translate with the translating structure 52, or in some examples, may be fixed and stationary with respect to the inner shell 48 and/or pylon 46. The translating structure 52 may include a pressure sleeve 56 and an outer casing 58 generally spaced radially outward from the pressure sleeve 56. The pressure sleeve 56 generally spans axially between a fan housing of a stationary structure 60 and a stationary, aft, cascade ring 59 of the structure 60 during normal forward propulsion of, for example, an aircraft. Similarly, the outer casing 58 spans axially rearward from the fan cowl 38. The pressure sleeve 56 and the outer casing 58 both span axially rearward and join to one-another at a point that is located substantially aft from the aft cascade ring 59. That is, a cross-section of the translating structure 52 resembles a horse-shoe that is open in the forward direction with respect to forward propulsion of the engine 20.

A plurality of blocker door devices 62 of the thrust reverser 40 are distributed circumferentially about the axis 22. Each device 62 has a blocker door 64 that is generally located radially inward of the pressure sleeve 56 of the translating structure 52 and spans axially from the fan housing 60 and to the aft section 54 of the outer shell 50 and the aft cascade ring 59 during forward propulsion of the engine 20. The blocker door 64 and the translating structure 52 are both capable of coincidental movement relative to the stationary cascade ring 59, thereby redirecting bypass airflow in the bypass flowpath 34 that may generally change aircraft power between forward propulsion and reverse propulsion. Each blocker door device 62 may further include a multi-armed linkage 66 capable of providing door stability and guiding movement of the blocker door 64 between a stowed state 68 (see FIGS. 3 and 4) for forward aircraft propulsion and a deployed state 70 (see FIGS. 8 and 9) for reverse or rearward aircraft propulsion.

The translating structure 52 of the outer shell 50 is driven substantially in an axial direction (see arrow 72), between a forward position 74 (see FIG. 3), placing the blocker door 64 in the stowed state 68, and an aft position 76 (see FIG. 8) placing the blocker door 64 in the deployed state 70. When in the forward position 74, the translating structure 52 may be substantially axially aligned to, and located radially outward from, the stowed blocker door 64. When in the aft position 76, the translating structure 52 may be substantially, axially, rearward to (i.e. aft of) the blocker door 64 and the cascade ring 59, and located substantially radially outward from the blocker door 64.

At least one master actuator 78 of the thrust reverser 40 (see FIG. 3) powers the axial movement of the translating structure 52 and may (as non-limiting examples) be hydraulically or electrically actuated or a combination of both. The actuator 78 may have a drive unit secured rigidly to the fan housing 60 and a hydraulic arm linked to the translating structure 52 and capable of being extended and retracted from the drive unit. The actuator 78 may be described as a 'master' and the linkage 66 may be described as a 'slave linkage' in the sense that the actuation of linkage 66 is directly dependent upon the driven motion of the translating structure 52. Without linear motion of structure 52, the linkage 66 may not move.

Figure 8:
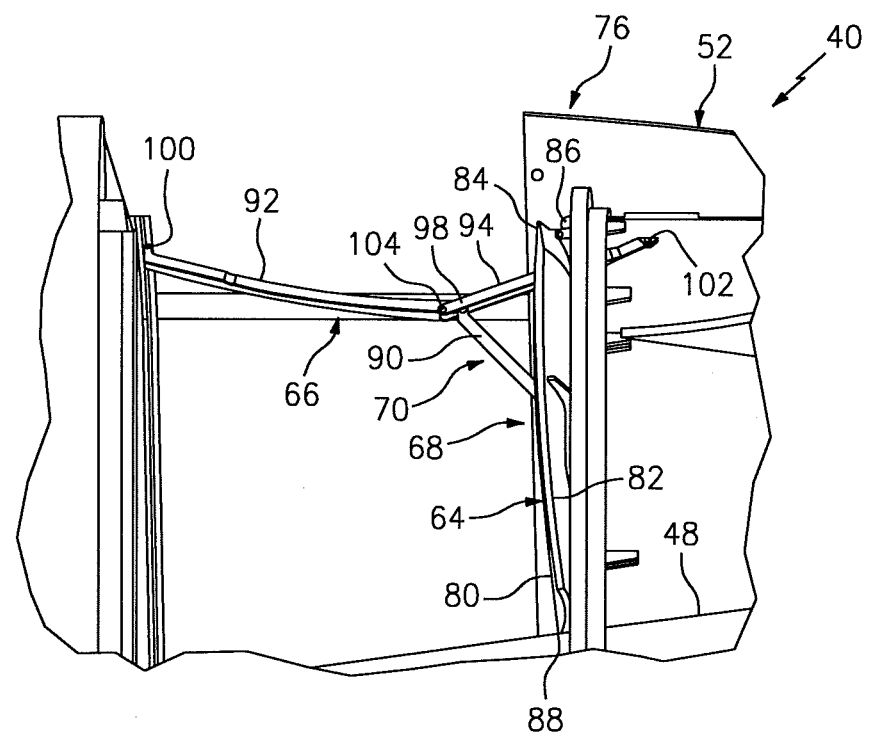
FIG. 8 is a partial cross sectional view of the thrust reverser in a deployed state.

Referring to FIGS. 3 and 8, the blocker door 64 has a concave, exposed, surface 80 that defines in-part the bypass flowpath 34 and an opposite surface 82 that faces radially outward and toward the pressure sleeve 56 when the blocker door 64 is in the stowed state 68. When in the deployed state 70, the surface 82 of the blocker door 64 may face in a substantially, axial downstream direction. The blocker door 64 further has and extends between a base or edge portion 84 attached to a forward end of the pressure sleeve 56 of the translating structure 52 by a pivotal connection 86, and an opposite distal edge 88. When in the stowed state 68, the edge portion 84 may be proximate to a rearward edge of the fan housing 60 and the distal edge 88 may be proximate to a forward edge of the aft section 54 of the outer shell 50. Similarly, and when in the stowed state 68, a forward edge of the pressure sleeve 56 may be releasably sealed to the rearward edge of the fan housing 60; and, a forward edge of the outer casing 58 of the translating structure 52 is proximate to a rearward edge or portion of the fan cowl 38. When in the deployed state 70, the blocker door 64 extends substantially radially, the edge portion 84 of the door 64 remains pivotally engage to the pressure sleeve 56, and the distal edge 88 may be moved to a position closer to the engine axis 22.

Referring to FIGS. 3 through 5 and 8, the blocker door 64 is capable of 'compound motion' that includes: 1) linear, motion attributable to the door 64 being directly engaged to the translating structure 52, and, 2) rotational or pivotal motion attributable to the rotational capability of the pivotal connection 86 and the multi-armed linkage 66. Furthermore, the blocker door device 62 may contain a 'lost motion' device in the sense that the translating structure 52 may move a relatively short axial distance rearward when initially moving away from the forward position and before the blocker door 64 begins to pivot away from the stowed state. This lost motion is enabled by the configuration of the linkage 66.

The linkage 66 may include first, second, and third arms 90, 92, 94 with associated first, second, third, fourth and fifth pivotal joints 96, 98, 100, 102, 104. Each joint 96, 98, 100, 102, 104 and the pivotal connection 86 have respective rotational axis 106 that are substantially parallel to one-another. A first end of the first arm 90 is engaged to the blocker door 64 by joint 96 and an opposite second end of the first arm 90 is engaged to an end of the second arm 92 by the second joint 98. An opposite second end of the second arm 92 is engaged to the fan housing 60 (or stationary structure rigidly engaged thereto) by the third joint 100. An end of the third arm 94 is engaged to the translating structure 52 by the fourth joint 102 and an opposite end of the third arm 94 is engaged to the second arm 92 by the fifth joint 104. The fourth joint 102 is spaced axially downstream from the pivotal connection 86, and the fifth joint 104 is located between the second and third joints 98, 100, and may further be proximate to and slightly spaced from the second joint 98.

Figure 9:
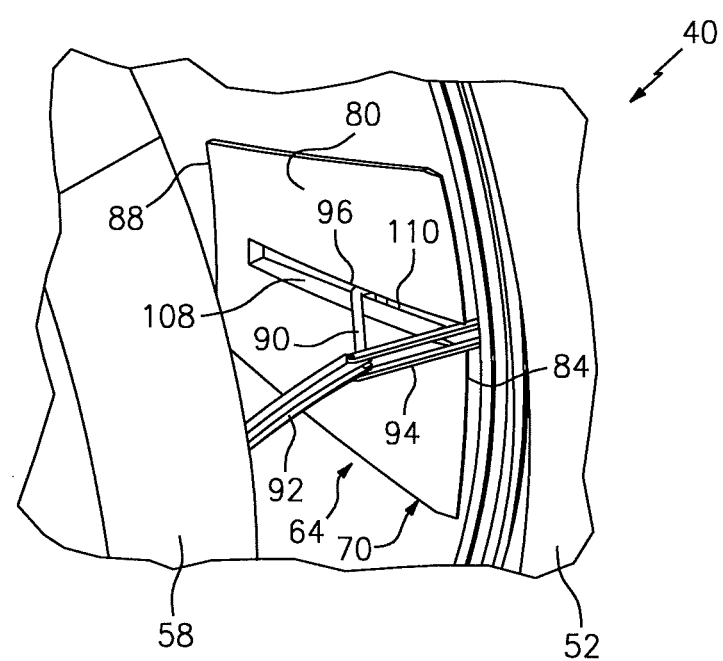
FIG. 9 is a partial perspective view of the thrust reverser in the deployed state.

Referring to FIG. 9, the blocker door 64 may have a channel 108 that extends longitudinally between the edge portion 84 and the distal edge 88, and a co-extending slot 110 that communicates through the door 64. The slot 110 may communicate through the base or edge portion 88 and extends longitudinally toward, but falling substantially short of, the distal edge 88 and short of the location of the first joint 96. The third arm 94 extends through the slot 110 and is located near the edge portion 84 when the blocker door 64 is in the deployed state 70, and is generally located at an opposite end of the slot near the first joint 96 when the blocker door 64 is in the stowed state 68 (see FIGS. 3 and 4). The channel 108 is defined by the exposed surface 80 and extends from the distal end of the slot 110 and further toward the distal edge 88, but falling short thereof.

The first joint 96 may be in the channel 108, and the combined length of the channel 108 and the slot 110 may be limited to about the length of the second arm 92. With the blocker door 64 in the stowed state 68, the channel 108 and slot 110 serve to store the first and second arms 90, 92 and a substantial portion of the third arm 94; thereby, substantially reducing or eliminating any obstructions in the bypass flowpath 34. That is, no substantial portion of the multi-armed linkage 66 extends across or otherwise obstructs bypass airflow, thus airflow efficiency is not reduced during normal flight operating conditions and noise is minimized. To further enhance this storage capability, the third arm 94 may be of a 'tuning-fork' shape to that the second arm 92 may fold into the third arm 94. Similarly, the second arm may be of a 'tuning-fork' shape such that the first arm 90 may fold into the second arm 92 when in the stowed state 68.

In operation and during normal flight conditions, the thrust reverser 40 is not deployed and the blocker doors 64 of the blocker door device 62 are in the stowed state 68 (see FIG. 3) thus defining in-part the non-diverted bypass flowpath 34. During this stowed state 68, there are no blocker door linkages that traverse the bypass flowpath 34 thus flow efficiency is optimized as the bypass air travels through the flowpath in a rearward direction contributing toward forward propulsion of the aircraft.

During certain flight scenarios, such as landing, and when the desire is to reduce aircraft forward speed, the thrust reverser 40 may be initiated. The master actuator 78 may then push the translating structure 52 in the rearward direction 72. As the translating structure 52 moves rearward a clearance 114 (see FIG. 7) begins to open between a forward end of the structure 52 and the combined rearward edges of the fan cowl 38 and fan housing 60. Moreover, and because the blocker doors 64 are attached to the pressure sleeve 56 of the translating structure 52, the clearance 114 also enlarges between the forward edge portion 84 of the blocker doors 64 and the rearward edge of the fan housing 60. As the clearance 114 widens, a cascade array or at least one turning vane 116, once stored between the pressure sleeve 56 and the outer casing 58 of the translating structure 52, is increasingly revealed and functions to further turn the bypass flow of air (see arrow 118) in at least a partially forward direction (see arrow 120). The array 116 may span between the fan housing 60 and the aft cascade ring 59, and may be rigidly secured to one or both.

During reverse thruster initiation, the blocker doors 64 also begin to pivot at the pivotal connection 86 engaged between the edge portion 84 and a forward end of the pressure sleeve 56. This pivoting motion is urged on by the linkage 66 as the second arm 92 of the linkage begins to pivot and rotate in a clockwise direction (see arrow 112 in FIG. 5) at the third joint 100 secured to the stationary structure or fan housing 60. As the blocker door 64 continues to deploy and open, the blocker door device 62 reaches a transitional state 122 (see FIG. 6) generally located between the stowed and deployed states 68, 70. At this transitional state 122, the second arm 92 begins to reverse rotational direction at the third joint 100 and begins to rotate in a counter-clockwise direction (see arrow 124 in FIG. 7).

Figure 7:
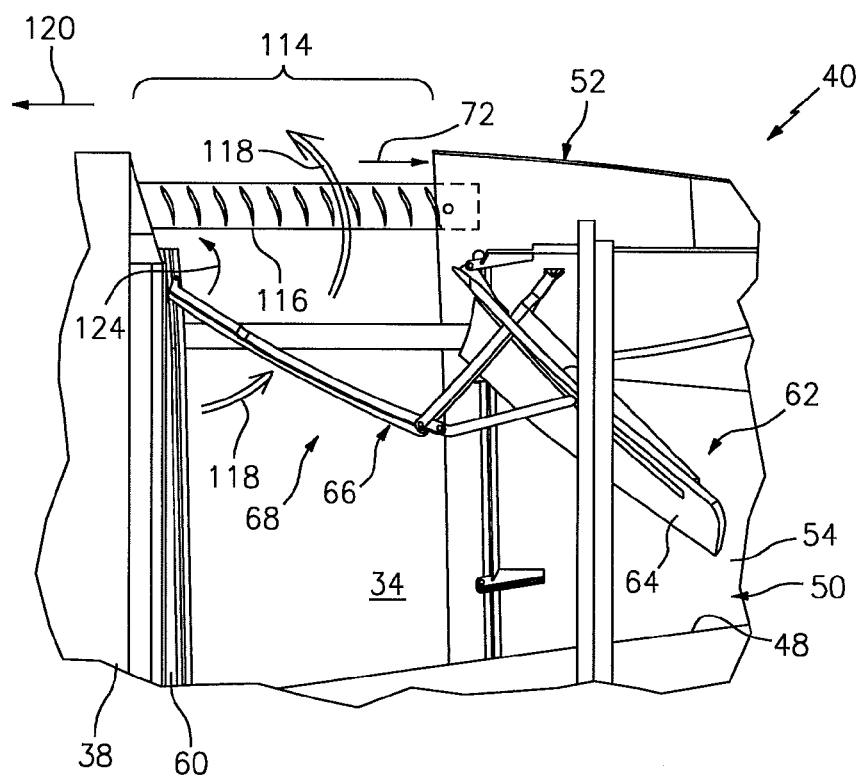
FIG. 7 is a partial cross sectional view of the thrust reverser moving yet further toward the deployed state.

Referring to FIGS. 8 and 9, and when fully deployed, the bypass flowpath 38 is substantially or completely diverted through the cascade array 116 (see FIG. 7). Each blocker door 64 has moved an axial distance substantially equal to the fully deployed clearance 114 that may be about the length of the blocker door 64, and has also pivoted about pivotal connection 86 in a clockwise direction and by about ninety degrees. When in the fully deployed state 70, the distal edge 88 of each blocker door 64 may be proximate to the inner shell 48 and the linkage 66 may generally cross over the diverted bypass flowpath.

It is understood that relative positional terms such as "forward," "aft," "upper," "lower," "above," "below," and the like are with reference to the normal operational attitude and should not be considered otherwise limiting. It is also understood that like reference numerals identify corresponding or similar elements throughout the several drawings. It should be understood that although a particular component arrangement is disclosed in the illustrated embodiment, other arrangements will also benefit. Although particular step sequences may be shown, described, and claimed, it is understood that steps may be performed in any order, separated or combined unless otherwise indicated and will still benefit from the present disclosure.

The foregoing description is exemplary rather than defined by the limitations described. Various non-limiting embodiments are disclosed; however, one of ordinary skill in the art would recognize that various modifications and variations in light of the above teachings will fall within the scope of the appended claims. It is therefore understood that within the scope of the appended claims, the disclosure may be practiced other than as specifically described. For this reason, the appended claims should be studied to determine true scope and content.

What is claimed is:

1. A blocker door device comprising:
   a blocker door moveable between a stowed position and a fully deployed position;
   a first arm pivotally connected to the blocker door;
   a second arm pivotally connected to the first arm at a first location along a length of the second arm; and
   a third arm pivotally connected to the second arm at a second location along the length that is different than the first location, wherein the third arm projects through the blocker door when the blocker door is in the fully deployed position.

2. The blocker door device set forth in claim 1 further comprising:
   a pivotal connection engaged to the blocker door;
   a first joint spaced from the pivotal connection and connecting the blocker door and the first arm;
   a second joint spaced from the first joint along the first arm and connecting the first and second arms; and
   a third joint engaged to the second arm and spaced from the second joint along the second arm.

3. The blocker door device set forth in claim 2 further comprising:
   a fourth joint engaged to the third arm; and
   a fifth joint spaced from the fourth joint along the third arm and connecting the third arm to the second arm.

4. The blocker door device set forth in claim 3 wherein the fifth joint is proximate to the second joint.

5. The blocker door device set forth in claim 3 wherein the fifth joint is located between the third joint and the second joint along the second arm.

6. The blocker door device set forth in claim 3 wherein the first joint, the second joint, the third joint, the fourth joint and the fifth joint are constructed and arranged to pivot about respective axes that are substantially parallel to one-another.

7. A blocker door device comprising:
   a blocker door;
   a first arm pivotally connected to the blocker door;
   a second arm pivotally connected to the first arm;
   a third arm pivotally connected to the second arm;
   a pivotal connection engaged to the blocker door;
   a first joint spaced from the pivotal connection and connecting the blocker door and the first arm;
   a second joint spaced from the first joint along the first arm and connecting the first and second arms;
   a third joint engaged to the second arm and spaced from the second joint along the second arm;
   a fourth joint engaged to the third arm; and
   a fifth joint spaced from the fourth joint along the third arm and connecting the third arm to the second arm;
   wherein the blocker door has a stowed state, a transitory state and a deployed state, and the third joint is constructed and arranged to reverse in rotating direction generally at the transitory state and as the blocker door moves between the stowed and deployed states.

8. A thrust reverser comprising:
   a fixed structure;
   a translating structure constructed and arranged to move between a first position and second position; and
   a blocker door device having a blocker door pivotally connected to the translating structure and constructed and arranged to move between a stowed state and a deployed state, and a multi-armed linkage pivotally engaged to the blocker door, the fixed structure and the translating structure for positioning the blocker door in the stowed state when the translating structure is in the first position, and in the deployed state when the translating structure is in the second position;
   wherein the multi-armed linkage comprises
      a first arm pivotally connected to the blocker door;
      a second arm pivotally connected to the first arm and the fixed structure; and
      a third arm pivotally connected to the second arm and the translating structure.

9. The thrust reverser set forth in claim 8 further comprising:
   a cascade array engaged to the fixed structure and for diverting a bypass flowpath defined in-part by the blocker door, and when the blocker door is in the deployed state.

10. The thrust reverser set forth in claim 8 wherein the translating structure is substantially cylindrical and concentric to an axis, and the blocker door device is one of a plurality of blocker door devices distributed circumferentially about the axis.

11. The thrust reverser set forth in claim 8 wherein the translating structure moves axially between the first and second positions.

12. The thrust reverser set forth in claim 11 further comprising:
   a pivotal connection engaged between a forward end portion of the translating structure and a base edge portion of the blocker door; and
   wherein the blocker door extends from the base edge portion and to an opposite distal edge of the blocker door, and extends substantially axially when in the stowed state and at least in-part radially when in the deployed state.

13. The thrust reverser set forth in claim 8 wherein the multi-armed linkage does not obstruct a bypass flowpath defined in-part by the blocker door when in the stowed state.

14. The thrust reverser set forth in claim 12 wherein the blocker door has compound-motion and pivots about the pivotal connection when moving between the stowed and deployed states and the translating structure moves axially between the first and second positions.

15. The blocker door device of claim 1, wherein the second arm has opposing ends, and the second arm extends longitudinally along the length between the opposing ends.

16. The blocker door device of claim 15, wherein the first location is at one of the opposing ends and the second location is longitudinally between the opposing ends of the second arm.

* * * * *